(12) United States Patent
Dessertenne

(10) Patent No.: US 8,300,645 B2
(45) Date of Patent: Oct. 30, 2012

(54) METHOD AND DEVICE FOR EXCHANGING DIAGNOSTIC DATA FOR THE SIMULATION OF AIRCRAFT COMPUTER NETWORKS

(75) Inventor: Franck Dessertenne, Colomiers (FR)

(73) Assignee: Airbus Operations SAS, Toulouse (FR)

( * ) Notice: Subject to any disclaimer, the term of this patent is extended or adjusted under 35 U.S.C. 154(b) by 809 days.

(21) Appl. No.: 12/146,853

(22) Filed: Jun. 26, 2008

(65) Prior Publication Data

US 2009/0010174 A1    Jan. 8, 2009

(30) Foreign Application Priority Data

Jun. 28, 2007 (FR) ...................... 07 56130

(51) Int. Cl.
*H04L 12/56* (2006.01)
(52) U.S. Cl. .................................... 370/395.4
(58) Field of Classification Search .......... 370/241–252, 370/395.2–395.43
See application file for complete search history.

(56) References Cited

U.S. PATENT DOCUMENTS

| | | | | |
|---|---|---|---|---|
| 7,697,450 | B2 * | 4/2010 | D'Amico et al. | 370/252 |
| 2003/0156549 | A1 * | 8/2003 | Binder et al. | 370/252 |
| 2005/0004787 | A1 * | 1/2005 | Kubischta et al. | 703/19 |
| 2005/0283684 | A1 * | 12/2005 | Walz | 714/47 |

FOREIGN PATENT DOCUMENTS

WO    WO 2005/088910 A1    9/2005

OTHER PUBLICATIONS

Daeyoung Kim et al., "Table Driven Proportional Access based Real-Time Ethernet for Safety-Critical Real-Time Systems", Proceedings, 2001 Pacific Rim International Symposium on Dependable Computing, 0-7695-1414-6, IEEE, Dec. 17, 2001, pp. 356-363.

Shiping Yang et al., "Integrated Safety Critical Systems on Reliable Real Time Network", Proceedings of the Fourth International Conference on Parallel and Distributed Computing, Applications and Technologies (PDCAT'2003), 0-7803-7840-7, IEEE, Aug. 27, 2003, pp. 66-70.

Hermann Kopetz et al., "The Time-Triggered Ethernet (TTE) Design", Proceedings of the Eighth IEEE International Symposium on Object-Oriented Real-Time Distributed Computing (ISORC'05), 0-7695-2356-0, IEEE, May 18, 2005, pp. 22-33.

* cited by examiner

*Primary Examiner* — Thai Hoang

(74) *Attorney, Agent, or Firm* — Oblon, Spivak, McClelland, Maier & Neustadt, L.L.P.

(57) ABSTRACT

A method and a device for exchanging diagnostic data for simulation of computer networks of aircraft are disclosed. Diagnostic data exchange is achieved in a network between a network node and a diagnostic terminal connected to the network. The network node is capable of receiving simulation commands in real time and diagnostic commands. According to the invention, the network node is capable of receiving simulation commands according to at least one predetermined time period, time-based segregation being achieved for emission of diagnostic data relative to processing of simulation commands.

19 Claims, 2 Drawing Sheets

METHOD AND DEVICE FOR EXCHANGING DIAGNOSTIC DATA FOR THE SIMULATION OF AIRCRAFT COMPUTER NETWORKS

BACKGROUND OF THE INVENTION

1. Field of the Invention

The present invention relates to a method and a device for exchanging diagnostic data over a network, especially a network of the "switch fabric" type.

A network of the "switch fabric" type is based on a switched architecture, meaning that the terminal equipment items in charge of data emission and reception are organized around commutators ("switch" in English terminology) in charge of transporting these data and having N inputs and N outputs. Communication is achieved by sending and receiving of packets, which are emitted in parallel.

More generally, the invention relates, in a network for real-time simulation of aircraft components, to diagnostics for these components.

2. Discussion of the Background

Simulation of aircraft components is used to ensure development and integration of electronic and information-processing systems mounted on board aircraft, especially before the maiden flight.

The simulation architecture comprises a plurality of terminals also known as network nodes, each of these terminals performing simulation calculations or constituting an electronic interface making it possible to verify the operation of real equipment items of the aircraft. Thus this architecture comprises in particular a simulation terminal capable of exchanging data within a synchronous sequence by using the request/response principle.

The network nodes designate the main calculation node or the electronic input/output interface cards.

Data exchange between the different network nodes takes place over a specific UDP port ("User Datagram Protocol" in English terminology) and in real time, meaning that the simulation of the behavior of equipment items is achieved at their real operating speed. It is based in particular on a standard Ethernet protocol.

SUMMARY OF THE INVENTION

By transposing the AFDX topology ("Avionics Full DupleX" in English terminology), in which two networks are operated in parallel, for the purpose of redundancy in the context of simulation on a standard network, one solution consists in envisioning a topology with two switched networks guaranteeing segregation of flows:
  a dedicated simulation network; and
  a dedicated diagnostic network.

Nevertheless, this solution suffers from real disadvantages: bulkiness and higher cost, because everything must be doubled (network switches, network cables, network interfaces of nodes, digital processing resources of nodes).

Thus one object of the present invention is to remedy at least one of the disadvantages of the techniques and processes of the described prior art. To achieve this, the invention proposes in particular a method and a device for exchanging diagnostic data between the nodes of the switched network while respecting the stringent constraints, such as no perturbation of the real-time progress of the simulation and of the associated data transfers.

The object of the invention is therefore a method for exchanging diagnostic data in a network between the client nodes of the network and a server node, also known as diagnostic terminal, connected to the network, each client node of the network being capable of receiving diagnostic commands and simulation commands in real time according to at least one predetermined time period, the method comprising time-based segregation for emission of the diagnostic data relative to processing of simulation commands.

The method according to the invention therefore makes it possible not to perturb the real-time execution of a simulation method.

According to a particular embodiment, the method comprises the following steps for determining the period during which diagnostic data may be emitted by the client nodes, in order to limit the simulation perturbations:
  determination of the date of the end of processing of a simulation command;
  determination of the date of the next reception of a new simulation command as a function of the said at least one predetermined time period;
  determination of a time interval between the date of the end of processing of a simulation command and the date of the next reception of a new simulation command; and
  emission of diagnostic data via the network during the time interval determined in this way.

Advantageously, the method additionally comprises a step of shortening of the time interval by a defined duration, in order to limit the risks of interference between the simulation and diagnostic functions.

According to another particular embodiment, the emission of diagnostic data is effected by the client nodes only if the width of the emission window is sufficient, or in other words greater than a predetermined threshold, in order to take into account the time during which the network is being used by the diagnostic function.

Another object of the invention is a computer program that can be loaded into an information-processing system, the said program containing instructions permitting use of the method of exchanging diagnostic data in a network between a network node and a diagnostic terminal connected to the network as described in the foregoing, when this program is loaded and executed by an information-processing system.

Another object of the invention is a device for exchanging diagnostic data in a network between the client nodes of the network and a server node (diagnostic terminal) connected to the network, each client node of the network being capable of receiving diagnostic commands and of receiving simulation commands in real time according to at least one predetermined time period, the device comprising means for time-based segregation for the emission of diagnostic data relative to processing of simulation commands.

The device according to the invention therefore makes it possible not to perturb the real-time execution of a simulation method.

According to a particular embodiment, the device comprises the following means for determining the period during which diagnostic data can be emitted, in order to limit perturbations of the simulation:
  means for determining the date of the end of processing of a simulation command;
  means for determining the date of the next reception of a new simulation command as a function of the said at least one predetermined time period;
  means for determining a time interval between the date of the end of processing of a simulation command and the date of the next reception of a new simulation command; and
  means for emitting diagnostic data via the network during the time interval.

Advantageously, the device additionally comprises means for reducing the width of the emission window by a defined duration, in order to limit the risks of interference between the simulation and diagnostic functions.

Advantageously, the means for emitting diagnostic data comprise means for comparing the time interval with a predetermined threshold, the means for emitting diagnostic data being suitable for emitting the diagnostic data if the width of the emission window is greater than a predetermined threshold, in order to take into account the time during which the network is being used by the diagnostic function.

Another object of the invention is a network node comprising the device for exchanging diagnostic data such as described in the foregoing.

BRIEF DESCRIPTION OF THE DRAWINGS

Other advantages, objectives and characteristics of the present invention become evident from the detailed description hereinafter, provided by way of non-limitative example, with reference to the attached drawings, wherein.

DESCRIPTION OF THE PREFERRED EMBODIMENTS

According to the invention, the diagnostics for a network for simulation of components, especially aviation components, is centralized and integrated. This simulation is based on stringent real-time constraints, to the effect that it must not be perturbed in any way if the real behavior of components is to be optimally simulated.

The functionalities of the diagnostics are in particular the following:
 determination of the network nodes that are present, especially in centralized manner, or in other words without using a point-to-point connection between a diagnostic tool and each of the input-output nodes;
 real-time monitoring, with the possibility of offsetting the monitoring and diagnostics graphic interface;
 establishment of mapping of network nodes and their configuration, especially the list of equipment items of the network and of software routines;
 looking up or modifying the assignment of parameters of network nodes;
 monitoring of the internal parameters and compilation of statistics;
 presetting of input/output paths and other parameters;
 real-time registration of parameters, especially in random-access memory;
 registration of breakdown contexts, especially in random-access memory;
 obtaining tables of parameter assignments, of configuration, of breakdown contexts and of registration; and
 managing of advanced statistics, such as the duration of processing of simulation messages, of the IP stack ("Internet Protocol" in English terminology) and of the message stack.

According to the invention, the diagnostic system is integrated into the simulation network and only a single network connection is necessary. In addition, the diagnostic function is centralized.

According to the invention, there is no load of additional terminals, and the investigation is undertaken in operational mode without disconnecting the nodes.

Figure 1:
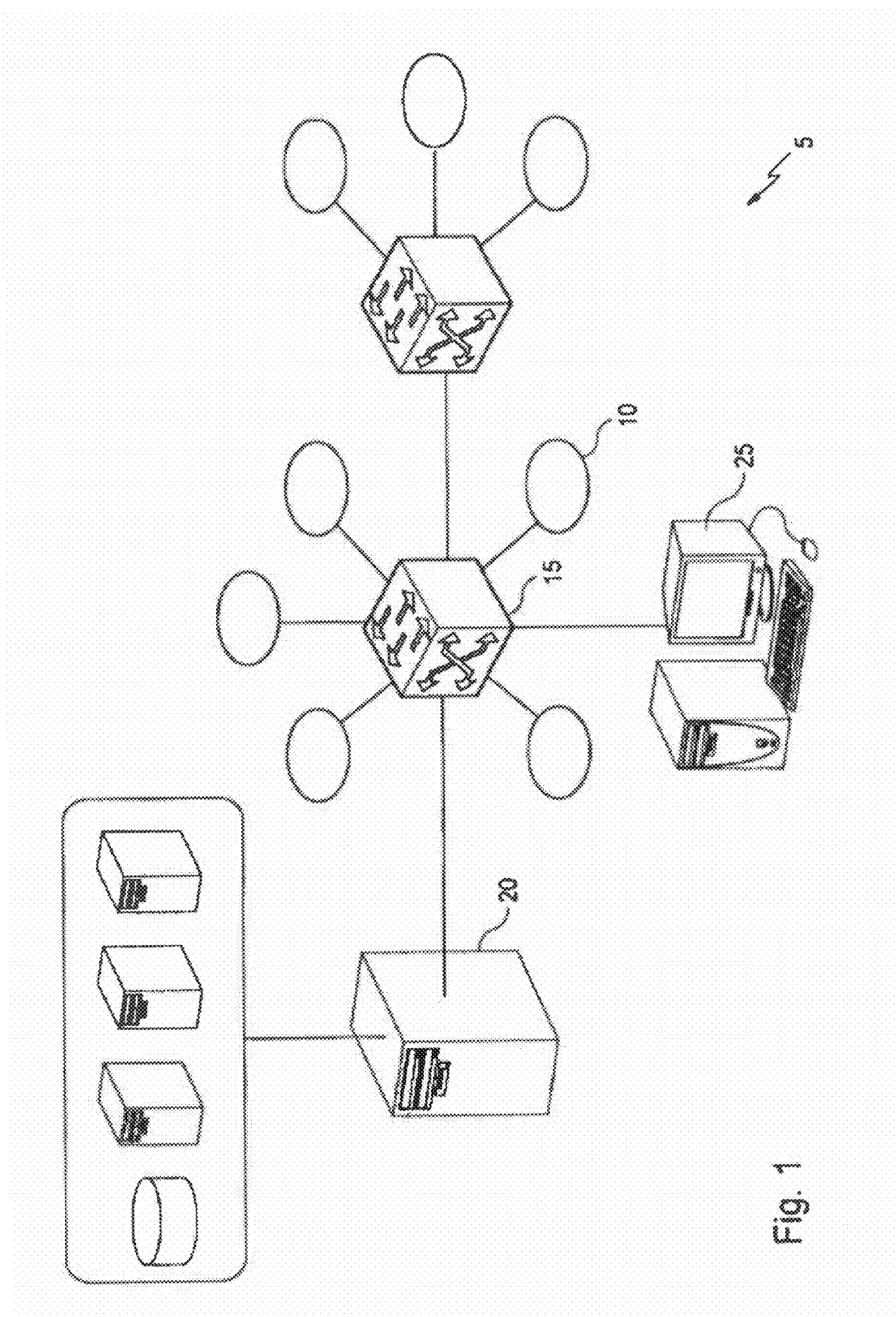
FIG. 1 illustrates a simulation network architecture in which there is integrated a diagnostic terminal according to the invention.

According to one embodiment of the invention, this is achieved in that the simulation network, illustrated in FIG. 1, comprises a set of network nodes capable of operating together in order to effect simulation of the real environment that is not present and its electronic interface with the real environment that is present and comprises, for example, avionic calculators, actuators and transducers.

Thus each of the nodes 10 of network 5 is connected to a main switch 15. These nodes 10 are especially calculating nodes, input/output cards, intermediate nodes and concentrators.

To this network 5 there are connected a main simulation calculator 20 (host in English terminology) on main switch 15 and a diagnostic equipment item 25.

In order to respect real time as well as possible, the network is a high-speed network, such as a 100 Mbit/s or 1 Gbit/s network.

According to the invention, the simulation and diagnostic functions are segregated on the basis of space and time, or in other words are partitioned.

Segregation on the basis of space is effectively achieved by servers, especially by having a simulation terminal and a diagnostic terminal that are distinct.

The data are also segregated on the basis of time, since the time periods, known as "emission windows", are positioned for communication of messages from the client nodes of the network to the diagnostic server terminal. These emission windows are obtained in particular by a synchronized algorithm used in the client nodes of the network.

Thus, according to the invention, the diagnostic data are inserted in the interior of the real-time data flow containing data of a simulation being transported, for example, via a proprietary maintenance protocol (UDP overlay).

In addition, on each of the client nodes of the network, especially on the nodes of "electronic interface" type, management by service (simulation or diagnostics) is achieved by relying on one specific UDP port to transport the simulation data and on another specific UDP port to transport the diagnostic data.

In addition, different lightweight execution processes ("threads" in English terminology) or tasks are executed on the network nodes in such a way as to manage each of the services and therefore each of the ports, especially one thread for execution of the simulation and one thread for execution of the diagnostics.

Thus each network node comprises a program (known as "plugin" in English terminology) that interacts with a main software routine, known as host program, to provide it with new functionalities. This program is a diagnostic program integrated in the operational application software of each node of the electronic interface.

The diagnostics can be achieved in synchronous mode or asynchronous mode (also known as "TRAP" mode in English terminology).

According to a synchronous embodiment, a diagnostic request makes it possible to launch specific processing on one node or on a set of given nodes, such as retrieval of tables of parameter assignments, registration, launching, stopping registration, presetting, modification of configuration, etc. At the end of processing, the response is emitted by the node or nodes that have been used.

According to an asynchronous embodiment, the diagnostics are activated by means of a unicast request, or in other words in point-to-point mode, or of a multicast request, or in other words by a request intended for a group of network nodes. Diagnostic data/statuses are then obtained periodically and automatically according to a programmable period.

According to the invention, the diagnostic equipment connected to the network must respect a certain number of rules in order to avoid perturbing the simulation being performed in real time. Effectively, it is preferred that data be emitted in unicast mode or even in multicast mode, but emission in broadcast mode, or in other words to all other points, is to be avoided so as not to inundate the network with messages.

In addition, it is just as important that the client nodes of the network not be perturbed by an excessively large flow of diagnostic requests. To achieve this, emission by the server node of data intended for a client node may be effected only in well-defined internals, such as every 10 ms, in the case of a simulation (if 10 ms if the minimal cycle for reception of a simulation command).

First, a specific request for identification of MAC addresses (acronym for "Medium Access Control" in English terminology), or in other words for a physical identifier stored in a network card or a network interface, used to globally attribute a unique address at the level of the link layer, which request is emitted by the diagnostic terminal before any other diagnostic exchange, makes it possible to establish MAC address/IP address pairs of network nodes on the basis of the identification responses. In this way, the diagnostic system positions static entries in its ARP buffer memory (acronym for "Address Resolution Protocol" in English terminology).

This request also makes it possible to position, at the network node level, a static entry in the ARP table, which entry corresponds to the MAC address/IP address pair of the diagnostic system.

Similarly, at the level of different network nodes, these must respect a certain number of rules.

In effect, the fragmentation of diagnostic messages upon emission is prohibited at the IP level. It must be effected at the level of the message layer in order to minimize the latency induced in the exchanges of simulation data (the nodes possess only a single network interface, via which the real-time simulation data and the non-real-time diagnostic data pass).

In addition, during the configuration phase, the IGMP protocol (acronym for "Internet Group Management Protocol" in English terminology) is used to configure the redirection table of the switch, making possible management of multicast IP addresses.

In addition, the electronic interface nodes of the network must respect the emission windows in order to emit the responses and the dispatches of messages in asynchronous mode.

Finally, emission of data in unicast mode must be given preference.

There now is described an algorithm that uses the emission window for diagnostic data. This algorithm is executed by the diagnostic task of the client nodes.

Each simulation data message is characterized by a pair comprising an identifier (ID) and a time period (T) in milliseconds as well as by an application data format.

Predefined beforehand for any simulation, a sequencing table comprising a set of pairs having an identifier and a time period is furnished by the simulation terminal to each node of the network during the configuration phase. Thus each node of the network possesses a specific sequencing table.

Starting from this table, each client node must then work by time-based sampling ("time slot" in English terminology).

According to one embodiment, the sampling period is one millisecond.

During reception of the first real-time data exchange message possessing the identifier $Id_{k0}$, each client node must, on the one hand, operate dynamic time warping, or in other words time-based initialization (t=0) and, on the other hand, must initialize a table of counters C such as described below:

$$C_1=T_1, C_2=T_2, \ldots, C_N=T_N$$

Each of these counters $C_k$ then indicates the number of milliseconds remaining for each identifier $ID_k$ before the next reception of a simulation request denoted $REQ[Id_k]$.

Thereafter, every millisecond, the network node effects an update of counter $C_k$ for all k. If the value of counter $C_k$ is strictly higher than 0 ($C_k>0$), then the value of this counter is decremented by the value 1 ($C_k=C_k-1$).

Upon each reception of a simulation request ($REQ[Id_k]$), a request being by definition received every period $T_k$ ms, the algorithm on the one hand reinitializes counter $C_k$ to the value of the period $T_k$ ($C_k=T_k$), and on the other hand administers statistics relating to the simulation data exchange messages. These statistics, used by the diagnostic function, make it possible to analyze the delays between the moments of theoretical reception and the moments of effective processing of the simulation requests $REQ[Id_k]$.

At the completion of this operation, an emission window is available for all k as soon as counter $C_k$ is higher than a defined threshold $\Delta_{min}$ ($C_k>\Delta_{min}$). During this emission window, each electronic interface node of the network is permitted to emit diagnostic data to the diagnostic terminal and to effect diagnostic processing operations, without nevertheless perturbing the real-time simulation in progress.

In addition, this algorithm thus guarantees that the latency induced by the diagnostic function in the sequencing of real-time data simulation (concurrent address over a single network interface) will be minimized.

The defined threshold $\Delta_{min}$ must be adjusted in particular by taking the following elements into account.

First of all, the threshold takes into account the absolute value of a maximum negative offset ("glitch" in English terminology) of the main calculator that is emitting the simulation messages. This value is determined by the maximum lead times of the emissions of this main calculator at startup. Effectively, this phenomenon may occur during any cycle following a time lag: phenomenon of recovery of the operating system upon a time interruption.

In addition, the threshold must take into account the processing time for emission of a diagnostic response $RESP[ID_{diagnostic}]$ operated by the core of the operating system used on the network node. In effect, the network node generally comprises a single network interface dedicated to the double role of simulation and diagnostics, which implies the use of a mutual exclusion mechanism (known as mutex for "Mutual Exclusion" in English terminology) in the UDP/IP protocol stack for synchronization, in order to guarantee that a shared resource will not be used at the same time by two distinct tasks.

Finally, the threshold must take into account the switching delay of the operation system during the changeover from the thread in charge of diagnostics to the thread in charge of simulation.

Figure 2:
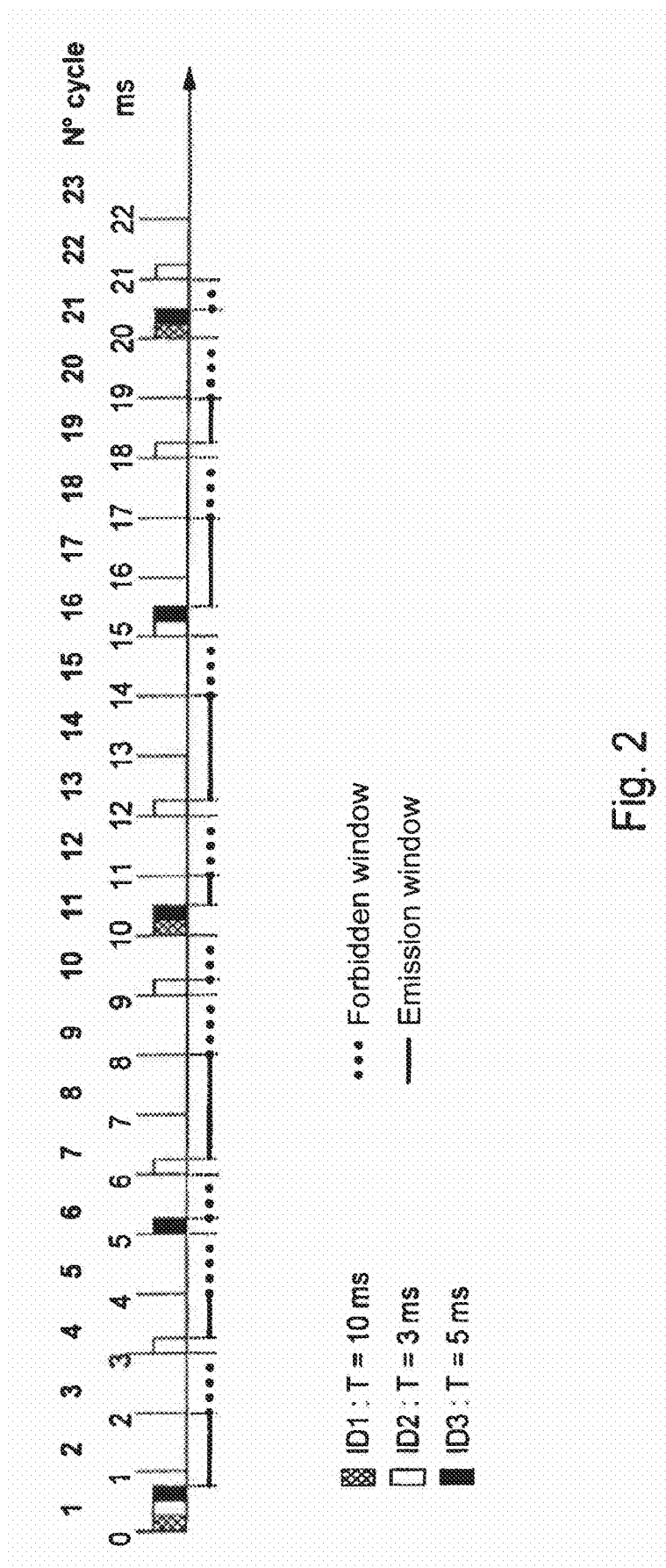
FIG. 2 presents a timing diagram illustrating the "emission windows" for a defined network node according to the invention.

In FIG. 2 there is presented a timing diagram illustrating the emission windows for a defined network node.

According to this example, the network node receives simulation data or commands ID1 every 10 ms, simulation data ID2 every 3 ms and simulation data ID3 every 5 ms.

By means of thick lines on the time scale, the timing diagram therefore illustrates the moment of reception of simulation data or commands, the time of processing of these data and the emission of the associated response.

Between these lines, the network node is capable of processing and emitting diagnostic data to the diagnostic server terminal.

Thus, since the emission windows are defined by the time available between two receptions and operations of processing of simulation data, shortened in such a way as to preserve the safety margin before any other reception of simulation data in real time, the reception and processing of simulation data are not perturbed.

In addition, problems of inversion of priority (by reason of the inevitable mutex on the network interface) if simulation and diagnostic data or commands arrive very close together at the UDP port of the network node are avoided in the same way.

According to the example under consideration, the width of each emission window therefore corresponds to the time interval between two receptions and operations of processing of simulation data shortened by one millisecond, the emission window beginning after emission of the simulation data.

According to the invention, the intrusive aspect of the diagnostic is negligible and is kept under control in the real-time simulation process.

According to this system, the latency time induced in the system is now determined. This time $\Delta t$[diagnostic request]$_{induced}$, relative to the reception of a diagnostic request that would be inserted just before a simulation request, therefore comprises the time for physical transfer over the network node link, the time for processing of the UDP/IP stack during reception of the request, and the time for switching the simulation task to the diagnostic task.

According to one embodiment, the time for physical transfer over the network node connection is 15 µs, the time for processing of the UDP/IP stack during reception of the request is 400 µs and the time for switching the threads is 10 µs.

The latency $\Delta t$[diagnostic request processing] induced by processing this diagnostic request is zero, because of the fact that it is managed by a task of priority lower than that of simulation.

Similarly, the latency $\Delta t$[diagnostic response] induced by emission of the diagnostic response is zero, because of the fact that the algorithm determines and uses the emission windows appropriate for emitting the responses. Thus, according to this embodiment, the latency induced by the diagnostic over every simulation request is approximately equal to the time for processing of the UDP/IP stack during reception of the request, or approximately 400 µs, which is negligible compared with the minimal simulation cycle, or in other words the shortest delay separating the simulation messages, which delay is 10 ms here.

Thus the intrusive aspect of the diagnostic in the real-time simulation system is negligible.

Of course, numerous modifications may be made to the exemplary embodiments described in the foregoing without going beyond the scope of the invention.

The invention claimed is:

1. A method for exchanging diagnostic data in a network between a node of the network and a diagnostic terminal connected to the network, the network node including a shared network interface capable of receiving simulation commands and diagnostic commands in real time, the method comprising:
   receiving the simulation commands at the network node within at least one predetermined time period;
   determining an emission time period for emitting diagnostic data by excluding a time period for processing a simulation command;
   performing time-based segregation of the diagnostic data emission via the shared network interface relative to the processing of the simulation command;
   the method further comprising:
   determining a date of an end of the processing of the simulation command;
   determining a date of a next reception of a new simulation command as a function of the at least one predetermined time period;
   determining a time interval between the date of the end of the processing of the simulation command and the date of the next reception of the new simulation command; and
   emitting the diagnostic data via the shared network interface during the time interval.

2. A method for exchanging diagnostic data according to claim 1, further comprising shortening of the time interval by a defined duration.

3. A method for exchanging diagnostic data according to claim 1 or claim 2, wherein the emitting the diagnostic data is effected if the time interval is longer than a predetermined threshold.

4. A method for exchanging diagnostic data according to claim 1, further comprising determining the emission time period by excluding a transfer time period for physical transfer of the simulation command across the network, a stack delay time for processing a communication stack during reception of the simulation command, and a thread switching time for switching from a simulation task thread to a diagnostic task thread.

5. A method for exchanging diagnostic data according to claim 1, wherein the diagnostic data is exchanged for performing a system simulation, the simulation command simulates a real message sent to a simulated component that is a part of the system being simulated, and the diagnostic commands control the system simulation without simulating any real message sent to the simulated component.

6. A method for exchanging diagnostic data according to claim 5, wherein the system being simulated is an aircraft and the simulated component is an aviation component.

7. A computer readable device storing computer instructions to be executed by a computer in a network having a network node and a diagnostic terminal, the network node including a shared network interface capable of receiving simulation commands and diagnostic commands in real time, and the computer instructions, when executed by the computer, cause the computer to perform steps comprising:
   receiving the simulation commands at the network node within at least one predetermined time period;
   determining an emission time period for emitting diagnostic data by excluding a time period for processing a simulation command; and
   performing time-based segregation of the diagnostic data emission via the shared network interface relative to the processing of the simulation command;
   the computer readable device further comprising:
   determining a date of an end of the processing of the simulation command;
   determining a date of a next reception of a new simulation command as a function of the at least one predetermined time period;

determining a time interval between the date of the end of the processing of the simulation command and the date of the next reception of the new simulation command; and emitting the diagnostic data via the shared network interface during the time interval.

8. A computer readable device according to claim 7, further comprising determining the emission time period by excluding a transfer time period for physical transfer of the simulation command across the network, a stack delay time for processing a communication stack during reception of the simulation command, and a thread switching time for switching from a simulation task thread to a diagnostic task thread.

9. A computer readable device according to claim 7, wherein the diagnostic data is exchanged for performing a system simulation, the simulation command simulates a real message sent to a simulated component that is a part of the system being simulated, and the diagnostic commands control the system simulation without simulating any real message sent to the simulated component.

10. A computer readable device according to claim 9, wherein the system being simulated is an aircraft and the simulated component is an aviation component.

11. A device for exchanging diagnostic data in a network between a node of the network and a diagnostic terminal connected to the network, the network node including a shared network interface capable of receiving simulation commands and diagnostic commands in real time, the device comprising:
a receiving section that receives a simulation command within at least one predetermined time period;
a determining section that determines an emission time period for emitting diagnostic data by excluding a time period for processing a simulation command; and
a scheduling section that performs time-based segregation of the diagnostic data emission via the shared network interface relative to the processing of the simulation command;
the device further comprising:
a first determining section configured to determine a date of an end of the processing of the simulation command;
a second determining section configured to determine a date of a next reception of a new simulation command as a function of the at least one predetermined time period;
a third determining section configured to determine a time interval between the date of the end of the processing of the simulation command and the date of the next reception of the new simulation command; and
an emitting section configured to emit the diagnostic data via the shared network interface during the time interval.

12. A device for exchanging diagnostic data according to claim 11, further comprising a shortening section configured to shorten the time interval by a defined duration.

13. A device for exchanging diagnostic data according to claim 11 or claim 12, wherein the emitting section is further configured to compare the time interval with a predetermined threshold and determine to emit the diagnostic data if the time interval is longer than the predetermined threshold.

14. A device for exchanging diagnostic data according to claim 11, wherein the determining section is further configured to determine an emission time period by excluding a transfer time period for physical transfer of the simulation command across the network, a stack delay time for processing a communication stack during reception of the simulation command, and a thread switching time for switching from a simulation task thread to a diagnostic task thread.

15. A device for exchanging diagnostic data according to claim 11, wherein the diagnostic data is exchanged for performing a system simulation, the simulation command simulates a real message sent to a simulated component that is a part of the system being simulated, and the diagnostic commands control the system simulation without simulating any real message sent to the simulated component.

16. A device for exchanging diagnostic data according to claim 15, wherein the system being simulated is an aircraft and the simulated component is an aviation component.

17. A network node comprising:
a device for exchanging diagnostic data in a network between a node of the network and a diagnostic terminal connected to the network, the network node including a shared network interface capable of receiving simulation commands and diagnostic commands in real time, the device comprising:
a receiving section that receives a simulation command within at least one predetermined time period;
a determining section that determines an emission time period for emitting diagnostic data by excluding a time period for processing a simulation command; and a scheduling section that performs time-based segregation of the diagnostic data emission via the shared network interface relative to the processing of the simulation command;
the device further comprising:
a first determining section configured to determine a date of an end of the processing of the simulation command;
a second determining section configured to determine a date of a next reception of a new simulation command as a function of the at least one predetermined time period;
a third determining section configured to determine a time interval between the date of the end of the processing of the simulation command and the date of the next reception of the new simulation command; and
an emitting section configured to emit the diagnostic data via the shared network interface during the time interval.

18. A method for exchanging diagnostic data in a network between a node of the network and a diagnostic terminal connected to the network, the network node being capable of receiving simulation commands and diagnostic commands in real time, the method comprising:
receiving the simulation commands within at least one predetermined time period;
performing time-based segregation of diagnostic data emission relative to a processing of a simulation command;
determining a date of an end of processing of the simulation command;
determining a date of a next reception of a new simulation command as a function of the at least one predetermined time period;
determining a time interval between the date of the end of the processing of the simulation command and the date of the next reception of the new simulation command; and
emitting the diagnostic data via the network during the time interval.

19. A device for exchanging diagnostic data in a network between a node of the network and a diagnostic terminal connected to the network, the network node being capable of receiving simulation commands and diagnostic commands in real time, the device comprising:
a receiving section that receives a simulation command within at least one predetermined time period;

a scheduling section that performs time-based segregation of diagnostic data emission relative to a processing of a simulation command;

a first determining section configured to determine a date of an end of the processing of the simulation command;

a second determining section configured to determine a date of a next reception of a new simulation command as a function of the at least one predetermined time period;

a third determining section configured to determine a time interval between the date of the end of the processing of the simulation command and the date of the next reception of the new simulation command; and an emitting section configured to emit the diagnostic data via the network during the time interval.

* * * * *